(No Model.)  2 Sheets—Sheet 1.

J. A. CROCKER.
FILTERING MACHINE.

No. 358,107.  Patented Feb. 22, 1887.

WITNESSES.
E. J. Stearns.
H. W. Stearns

INVENTOR.
James A. Crocker,
pr. Norman W. Stearns,
Atty.

(No Model.) 2 Sheets—Sheet 2.
J. A. CROCKER.
FILTERING MACHINE.
No. 358,107. Patented Feb. 22, 1887.
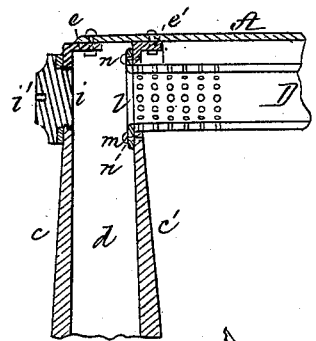
Fig. 6.
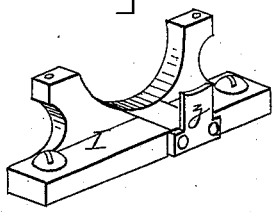
Fig. 7.
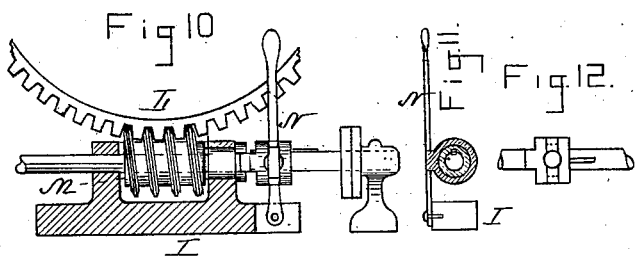
Fig. 10.
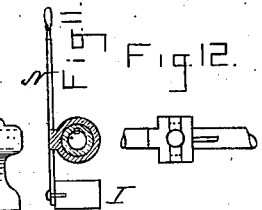
Fig. 11. Fig. 12.
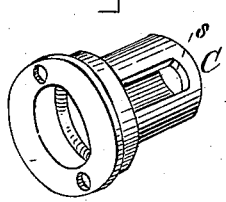
Fig. 7.
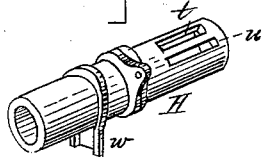
Fig. 8.
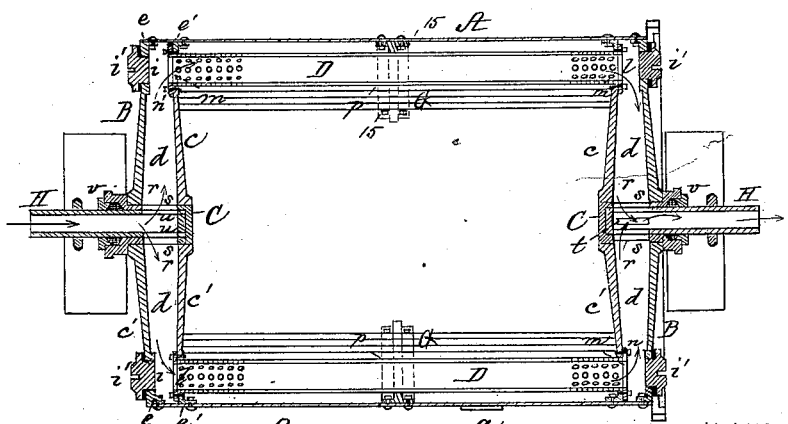
Fig. 5.
WITNESSES.
E. J. Stearns.
H. W. Stearns.
INVENTOR.
James A. Crocker,
pr Norman W. Stearns,
Atty.

United States Patent Office.

JAMES ALLEN CROCKER, OF BOSTON, MASSACHUSETTS, ASSIGNOR TO THE CROCKER FILTERING COMPANY.

FILTERING-MACHINE.

SPECIFICATION forming part of Letters Patent No. 358,107, dated February 22, 1887.

Application filed April 16, 1886. Serial No. 199,054. (No model.)

*To all whom it may concern:*

Be it known that I, JAMES ALLEN CROCKER, of Boston, in the county of Suffolk and State of Massachusetts, have invented certain Improvements in Filtering-Machines, of which the following is a full, clear, and exact description, reference being had to the accompanying drawings, making part of this specification, in which—

Figure 2:
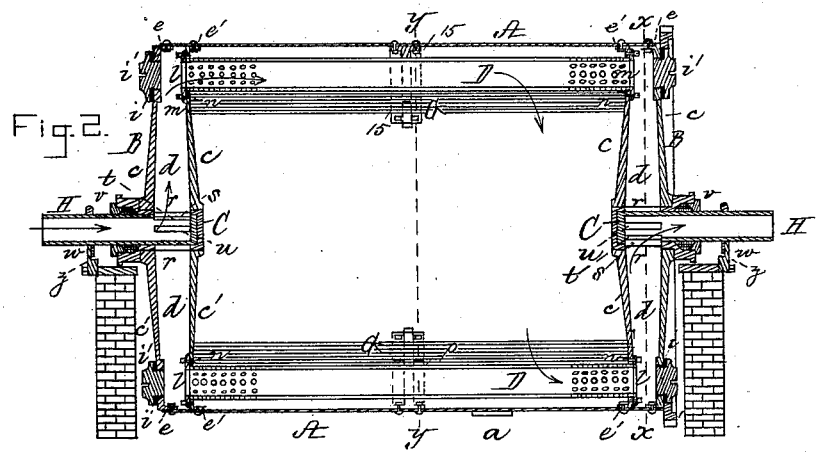
Figure 1:
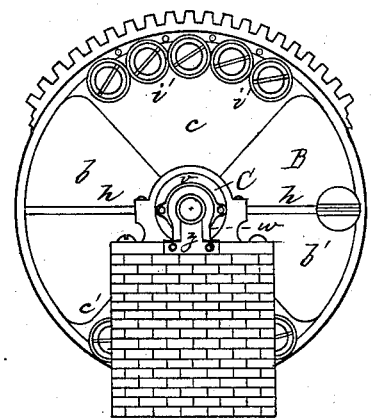
Figure 3:
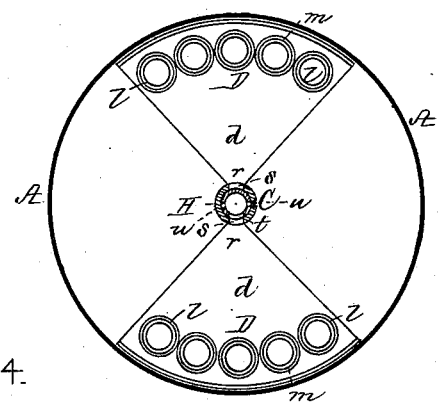
Figure 4:
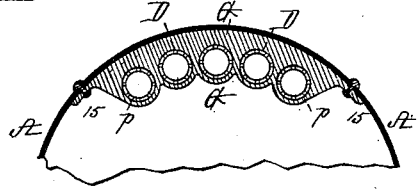

Figure 1 is an end elevation of my improved filtering-machine. Fig. 2 is a longitudinal vertical section through the center of the same. Fig. 3 is a transverse section on the line $x\ x$ of Fig. 2; Fig. 4, a transverse section on the line $y\ y$ of Fig. 2. Fig. 5 is a longitudinal horizontal section through the center of the filter when turned one-quarter of a revolution from the position shown in Fig. 2, the various ports for the passage of the water being thereby moved into different positions; Figs. 6, 7, 8, 9, 10, 11, and 12, details to be referred to.

My present invention has for its object to afford additional facilities for the construction and manipulation of filtering-machines used in manufacturing establishments and reservoirs for supplying water to cities for drinking purposes, &c., particular reference being had herein to that class of water-filters described in Patent No. 305,574, granted to me September 23, 1884, in which a single shell or casing containing the filtering material is employed without any other or inclosing casing; and one of the features of this invention consists in two series of perforated pipes or tubes, each open at both ends and extending between and communicating with water-passages formed in the hollow heads of the single shell or casing, in combination and communicating with hollow stationary journals, which serve as inlet and outlet pipes and around which the single filter-casing is capable of being revolved, whereby the water when being filtered is made to circulate freely through the entire mass of filtering material located within the strainers.

In the said drawings, A represents a single cylindrical shell or casing, formed, preferably, of plates of boiler-iron riveted together, the entire cylindrical surface being closed, but provided with a man-hole, the lid $a$ of which is removed when it is desired to introduce or remove the filtering material. Each end is also closed, and consists in a head, B, two portions, $b\ b'$, of which, (each representing a quadrant,) diametrically opposite each other, being of single thickness, and each of the remaining portions, $c\ c'$, (also quarters,) being of double thickness, with a space serving as a water-passage, $d$, between them. Each passage $d$ is wider at the center of the end of the casing, where the hollow hub C communicates with the head in which the passage is located, said passage tapering to about one-half this width at its outer end, the measurements being taken in a longitudinal direction. (See Figs. 2 and 5.) The outside of each of the two portions $b\ b'$ of the head—i. e., the outside of the portion of single thickness—has extending around its periphery a narrow horizontal flange, $e$, which fits snugly against the under side and near the end of the shell, and is secured thereto by rivets or otherwise, Figs. 2 and 5.

The portions $b\ b'$, (those of single thickness,) between their peripheral flanges and the exterior of the hub, lie in a vertical plane and are re-enforced by webs or braces $h$. The periphery of the inside of each of the outer tapering walls (of the double-head portions $c\ c'$) is also provided with a narrow horizontal flange, $e'$, which is secured by rivets to the under side of the single shell or casing. Each outer wall of the portions $c\ c'$ is provided with a number of independent openings, $i$, over each of which is fitted an independent cover, $i'$, said openings being made in order to admit of the introduction of two series of perforated pipes, D, which are arranged in a horizontal position side by side in two groups, one diametrically above the other. The cover for each opening may consist of a shouldered screw-plug, $i'$, Fig. 6, with a washer interposed between it and the wall, or the cover may be a round plate bolted in place. Each series of these pipes extends between and communicates with the water-passages $d$ in the two correspondingly-located opposite double heads of the casing.

The inner walls of the portions $c\ c'$ of the heads are provided with a number of circular openings, $l$, corresponding to the number of the pipes to be secured therein—five, for instance, in each upper head and five in each lower head being shown in the drawings a number of pipes being preferred in each series on account of the greater area of filtering-surface thereby obtained. Each end of each perforated pipe terminates at the outer face of the inner portion, c', and abuts against an annular collar, m, which is held in place by screws n, Fig. 6.

G is a metal plate provided with openings p for the reception of the perforated pipes, and is located at about the longitudinal center thereof, being provided with flanges 15, which are riveted to the under side of the casing, said plate serving as a support to prevent the sagging of the pipes, which would otherwise take place if they were of considerable length.

By removing the covers i' from the openings i in the heads of the casing, the pipes D are accessible for the entrance of brushes, in order to remove any fibrous matter which may have adhered thereto; and by removing the screws n, collars m, and screw-plugs or other covers i', the pipes may be withdrawn from the filtering-machine.

Leading from the circular opening in the center of each end of the casing are two rectangular holes or ports, r, diametrically opposite, one communicating with the upper water-passage d and the other with the lower water-passage d, and within this circular opening at each end of the casing is located a hollow hub, C, which is secured immovably thereto, so as to revolve in common therewith around a stationary hollow journal, H, through which the water to be filtered passes from a pipe to be connected therewith, (but not shown in the drawings,) one hollow journal being intended to be connected with a supply-pipe and the other with a discharge-pipe.

The hollow hub C is provided with two rectangular openings or ports, s, diametrically opposite each other, of corresponding size, and in line with the rectangular ports r of the hollow portions c c' of the heads of the casing.

Each hollow journal H has three rectangular ports or openings, one large port, t, normally on the upper side of the left-hand journal and normally on the lower side of the right-hand journal. This port t registers or is in a direct line with the rectangular port s of the hollow hub which happens to be thereover; also, two smaller ports, u, of equal size, each about one-half the size of the large port t, the location of the two smaller ports u being through the sides of the hollow journal at points diametrically opposite each other.

While the water is being filtered, the position of the perforated pipes D and the various ports r s t u is as shown in Fig. 2, to wit: The opening or port r in the bottom of the upper hollow head at the left end of the casing is in line with the upper port s of the hollow hub C, and also with the upper or larger port, t, (supply-port, for instance,) of the stationary hollow journal H, the lower or closed portion of the journal in this (the left-hand) side of the casing being at this time in line with and closing the lower port s in the hub, and consequently the lower port, r, of the lower water-passage d, thus preventing the flow of the water in this direction, the position of the similar ports r s t of the water-passage, hollow hub, and hollow journal on the opposite or right end of the filter being reversed, while the two series of perforated pipes D are located vertically over each other.

In the aforesaid position of the parts, the water, while being filtered, is conducted by the supply-pipe into the inlet hollow journal H, (at the left hand), up through its port t, through the port s of the hollow hub C, and up through the port r in the contiguous water-passage d, and through it and the upper horizontal pipes D, through their perforations, down into and through the filtering material between the two series of pipes, and thence up the right-hand lower water-passage d in the lower double head, through the open ports t s r, and out by the outlet-journal, the direction of the water while being filtered being represented by the arrows, Fig. 2.

For flushing or removing coarse dirt which may have lodged in the pipes and cannot pass out through their perforations, I give one-quarter of a revolution to the casing, so as to bring the perforated pipes of one series horizontally opposite those of the other series, in which position the water will not flow through the body of the filtering material between the two series of pipes, but will pass in the direction of the arrows, Fig. 5, directly through both series of pipes from end to end, and through all of the water-passages d of the double heads, the two small ports u on the sides of each hollow journal registering with the two ports s of each hollow hub which has has been so revolved in common with the casing that these ports s are brought horizontally opposite each other.

Each hollow journal, where it enters its hollow hub, is surrounded by a packing held in place by a gland or sleeve, v, interposed between the journal and the hub, whereby a water-tight joint is insured. Each journal is also provided with a flange or projection, w, having a socket or dovetail recess, said projection w extending down from the journal and formed integral therewith or secured immovably thereto, and the journal-bearing I has a standard or upright horn, z, fitting within said socket or recess in the flange or projection w, by which means the journals are prevented from rotating and their ports t t are held in their upper and lower normal positions, respectively.

The filtering material may consist of charcoal, &c., and be either packed tightly or placed loosely within the casing and around the perforated pipes D, and when, owing to the attrition of the particles caused by the water, a new supply is needed it may be introduced through the man-hole. The periphery of one end of the casing is provided with a gear, L, with which engages a worm, M, located thereunder, and by which the filter can be revolved.

Where a number of filters are grouped together and connected by circular gear L and worm-gear M, they may all be simultaneously revolved or reversed, or one filter may be revolved without turning another, an ordinary clutch mechanism connected with and actuated by a shipper-lever, N, being employed, the movement of the handle of the shipper from left to right permitting the revolution of the shaft without revolving the worm-gear M surrounding it, and consequently not revolving the filter contiguous thereto and provided with the gear L.

I claim—

1. In combination with the cylindrical portion of a single shell or casing and its heads secured thereto, a water-passage at each end, of decreasing width from the hub to the strainer in cross-section taken in a vertical plane passing through the axis, and of increasing length from the hub to the strainer in cross-section taken in a vertical plane at right angles to the axis, in order that a passage of uniform and equal area may be provided from the outlet of the water at the hub to its outlet at the strainer, as and for the purpose described.

2. An improved filtering-machine possesing the following elements in its construction, to wit: a single shell or casing having at each end a pair of hollow diametrically-opposite heads, each provided with a water-passage, the dimension of which (measured horizontally in a direction longitudinal with the casing) increases from its periphery toward the center of the filter, while the dimension of said passage (measured horizontally in a direction transversely with the casing) decreases from the periphery to the center of the filter, each hollow head having a port which, as the casing is revolved, becomes alternately an inlet or an outlet port, a hollow hub provided with two diametrically-opposite ports and secured to the casing so as to revolve in common therewith, a hollow stationary journal having three ports and two series of horizontal perforated pipes, D, open from end to end and located diametrically opposite each other and extending between the correspondingly-located water-passages $d$, all constructed and arranged substantially as and for the purpose described.

Witness my hand this 1st day of April, 1886.

JAMES ALLEN CROCKER.

In presence of—
N. W. STEARNS,
H. W. STEARNS.